3,081,176
SOLUBLE OIL FOR TREATING FILTERS
Howard M. Rue, Media, Pa., assignor to Sun Oil Company, Philadelphia, Pa., a corporation of New Jersey
No Drawing. Filed July 18, 1960, Ser. No. 43,308
5 Claims. (Cl. 106—15)

This invention relates to lubricants. More particularly, the invention concerns soluble oils and emulsions containing them for use in a specific application, i.e., gas filters.

Filters are used to remove dust from the air and other gases which are circulated in various heating and cooling devices. The filters are made more efficient by treatment with a soluble oil-in-water emulsion containing a water-soluble alkali metal borate salt in the water phase. The oil deposited on the filter fibers increases dust retention and the borate compound serves as a fire retardant. The emulsion must be maintained in the oil-in-water state to obtain a uniform film of oil and borate on the fibers after most of the water has evaporated.

The alkali metal borate tends to cause the emulsion to invert to the water-in-oil state before application to the filter, resulting in poor coverage. In the past, inversion has been prevented by the addition of ammonium hydroxide to the emulsion. Since the ammonia vaporizes so readily, a batch of emulsion cannot be prepared very far in advance. The strong pungent odor of ammonia creates problems in the application of the emulsion to the filters.

I have discovered a soluble oil composition which forms stable emulsions in the presence of borate salts without the use of ammonium hydroxide. The emulsion has excellent fiber-wetting properties and permits good continuity of the borate coating which results in increased fire resistance.

In accordance with the present invention, a sodium alkyl sulfate is added to the base soluble oil in an amount sufficient to prevent inversion in the presence of the borate compound.

The wetting agent of the emulsion is an alkali sulfate substituted aliphatic hydrocarbon. The hydrocarbon chain may be straight or slightly branched and preferably contains from 12 to 20 carbon atoms. Suitable examples are sodium heptadecyl sulfate, sodium tetradecyl sulfate and sodium dodecyl sulfate. In order to obtain emulsion stability, it is necessary that at least 0.50% by weight of the wetting agent be present in the final emulsion. The wetting agent may be added to the soluble oil in concentrated form or as an aqueous solution and must be present in the soluble oil in an amount of at least 2.0 weight percent so that it will be present in the final emulsion in an amount of at least 0.50 weight percent.

The base soluble oil comprises petroleum sulfonates together with a naphthenic lubricating oil. Such soluble oils and their preparation are disclosed in U.S. Patents 2,433,646 to Carter et al. and 2,680,716 to Lipkin et al. Petroleum sulfonates prepared in the manner disclosed in U.S. Patents 2,722,543 to Anderson and 2,824,125 to Davis et al. are the preferred sulfonate components of the soluble oil component of the invention. They should be present in the final emulsion in an amount of 5.0% by weight or greater in order to form a stable emulsion. On the basis of the soluble oil concentrate, the sulfonates must be present in an amount of at least 14.0 weight percent. Suitable ranges of ingredients are shown below:

| Soluble Oil Concentrate, Wt. Percent | Ingredient | Final Emulsion, Wt. Percent |
|---|---|---|
| 14–18 | Petroleum Sulfonates | 5–7 |
| 2–14 | Aliphatic Alkali Metal Sulfate | .5–3.5 |
| 6–10 | Water A[1] | 2–5 |
| 58–80 | Naphthenic Oil | 24–35 |
| -------- | Alkali Borate | 1–6 |
| -------- | Water B[2] | 50–70 |
| 100 | Total | 100 |

[1] Water A—Represents water present in petroleum sulfonates and aliphatic alkali metal sulfate solution.
[2] Water B—Represents water added to the soluble oil concentrate in formulating the final emulsion.

The following soluble oil concentrates were prepared.

Soluble oil A:

| | Weight percent |
|---|---|
| Sodium sulfonates, 440–460 average molecular weight | 14.70 |
| Water | 7.76 |
| Sodium tetradecyl sulfate | 2.19 |
| 100–125 SSU/100° F. naphthenic oil | 75.35 |
| | 100.00 |

Soluble oil B:

| | Weight percent |
|---|---|
| Sodium sulfonates, 440–460 average molecular weight | 14.80 |
| Water | 5.31 |
| Sodium tetradecyl sulfate | 1.36 |
| 100–125 SSU/100° F. naphthenic oil | 78.53 |
| | 100.00 |

When 36.2 weight percent of soluble oil A was mixed with 58.1 weight percent water and 5.7 weight percent sodium borate, a stable oil-in-water emulsion resulted. However, when 36.2 weight percent of soluble oil B was mixed with 58.1 weight percent water and 5.7 weight percent sodium borate, the emulsion was unstable and quickly inverted. For this reason, it is necessary that the soluble oil contain at least 14.0 weight percent petroleum sulfonates and at least 2.0 weight percent aliphatic alkali metal sulfate.

The fire retardant of the composition is dissolved in the water phase in an amount of from 1 to 6 weight percent. Alkali metal borates such as sodium or potassium borate are preferred.

The filter to which the composition of the present invention is applied may be any of those known in the prior art. They are usually composed of fibers of glass wool, steel wool, rock wool or natural or synthetic fibers arranged in a random matter to form a batt. Thickness and dimensions are related to the type of service to which the filter will be applied. The same considerations apply to the amount of emulsion applied to the filter and the method of applying it. Spraying is the most common method of application.

I claim:
1. A soluble oil for use in oil-in-water emulsions containing an alkali metal borate compound dissolved in the water phase consisting essentially of at least 14.0 weight percent petroleum sulfonates, at least 2.0 weight percent of an aliphatic alkali metal sulfate, a naphthenic lubricating oil and water.

2. The soluble oil according to claim 1 wherein the components are present in the following amounts:

| | Weight percent |
|---|---|
| Petroleum sulfonates | 14–18 |
| Aliphatic alkali metal sulfate | 2–14 |
| Naphthenic lubricating oil | 58–80 |
| Water | 6–10 |

3. The method of simultaneously lubricating and fireproofing fibers employed in gas filters comprising coating the fibers with an oil-in-water emulsion consisting essentially of the following components:

| | Weight percent |
|---|---|
| Petroleum sulfonates | 5–7 |
| Aliphatic alkali metal sulfate | .5–3.5 |
| Naphthenic lubricating oil | 24–35 |
| Alkali borate | 1–6 |
| Water | 52–75 |

4. A lubricating and fireproofing oil-in-water emulsion consisting essentially of water, an alkali metal borate compound dissolved in the water, and a soluble oil consisting essentially of naphthenic lubricating oil, water, at least 14.0 weight percent petroleum sulfonates and at least 2.0 weight percent aliphatic alkali metal sulfates.

5. A lubricating and fireproofing oil-in-water emulsion consisting essentially of 52–75 weight percent water, 1–6 weight percent sodium borate dissolved in the water, 5–7 weight percent sodium sulfonates, 0.5–3.5 weight percent sodium alkyl sulfate and 24–35 weight percent naphthenic lubricating oil.

References Cited in the file of this patent

UNITED STATES PATENTS

| 2,433,646 | Carter et al. | Dec. 30, 1947 |
| 2,769,729 | Van de Zande | Nov. 6, 1956 |